US006787738B2

(12) United States Patent
Odorcic et al.

(10) Patent No.: US 6,787,738 B2
(45) Date of Patent: Sep. 7, 2004

(54) CARBON MONOXIDE SENSED OVEN CLEANING APPARATUS AND METHOD

(75) Inventors: Kresimir Odorcic, Shepardsville, KY (US); Omar Haidar, Prospect, KY (US); Robert Cissell, Louisville, KY (US); Michael McGonagle, Louisville, KY (US); Scott Horning, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/248,528

(22) Filed: Jan. 27, 2003

(65) Prior Publication Data

US 2004/0144768 A1 Jul. 29, 2004

(51) Int. Cl.[7] ............................ A21B 1/40; F24C 14/02

(52) U.S. Cl. ........................ 219/391; 219/400; 219/413; 219/492; 219/497

(58) Field of Search ................................ 219/391, 400, 219/492, 413, 490, 497

(56) References Cited

U.S. PATENT DOCUMENTS

| | | | | | |
|---|---|---|---|---|---|
| 4,481,404 | A | | 11/1984 | Thomas et al. | |
| 4,852,544 | A | | 8/1989 | Williams et al. | |
| 4,954,694 | A | * | 9/1990 | Nagai et al. | 219/413 |
| 5,286,943 | A | * | 2/1994 | Has | 219/413 |
| 5,386,099 | A | * | 1/1995 | Has | 219/413 |
| 6,232,584 | B1 | * | 5/2001 | Meyer | 219/497 |
| 6,285,290 | B1 | * | 9/2001 | Kouznetsov | 340/630 |
| 6,392,204 | B2 | * | 5/2002 | Corda et al. | 219/413 |
| 2002/0005401 | A1 | * | 1/2002 | Meyer et al. | 219/413 |

* cited by examiner

*Primary Examiner*—Joseph Pelham
(74) *Attorney, Agent, or Firm*—H. Neil Houser, Esq.; Armstrong Teasdale LLP

(57) ABSTRACT

A self-cleaning oven includes an oven cavity, a gas sensor in flow communication with the oven cavity, and a controller configured to select one of a plurality of self-clean cycle times based upon a peak value of sampled signals of the gas sensor.

21 Claims, 5 Drawing Sheets

CARBON MONOXIDE SENSED OVEN CLEANING APPARATUS AND METHOD

BACKGROUND OF INVENTION

This invention relates generally to cooking ovens, and, more particularly, to control systems for self-cleaning ovens.

Cooking ovens include a cooking cavity having a number of interior walls and an access door, and one or more heating elements cook food placed into the cooking cavity. As the oven is used, the interior walls and interior portions of the cooking cavity and the door are inevitably soiled with cooking residue. Cleaning the oven of this unsightly residue can be a difficult endeavor.

Some types of ovens are operable in a self-cleaning mode wherein the oven heating elements are operated to raise the oven temperature to levels sufficient to burn soil off of the internal surfaces of the oven. Once this temperature is reached, the oven temperature is maintained for some time to satisfactorily remove the residue from the interior of the oven. The cleaning process produces a considerable amount of by-products which are exhausted from the oven cavity through a vent. See, for example, U.S. Pat. No. 4,481,404.

Typically, the self-cleaning cycle is a time-based operation that lasts up to four hours at high oven temperatures, for example, of about 900° F. Energy consumption in the self-clean cycle can therefore be substantial. In electronically controlled ovens, the oven controllers include programmed pre-determined default times for a self-clean algorithm execution. Under average use conditions, the default time is adequate to clean the oven. This approach, however, is disadvantageous in several aspects as oven soil conditions vary in use, because the self-clean cycle is executed for the duration of the default time and generally without regard to a condition of the oven.

Thus, for example, when the oven cavity is relatively clean, the default clean time tends to be excessive. That is, the self-clean cycle continues for some time after the oven is actually cleaned. Excessive self-clean cycles are inefficient from both a time and energy perspective.

In contrast, when the oven cavity is heavily soiled, the default clean time may not be long enough for the oven to be adequately cleaned. Insufficient clean times lead to unfulfilled consumer expectations and decreased customer satisfaction with the oven.

SUMMARY OF INVENTION

In one aspect, a self-cleaning oven is provided. The oven comprises an oven cavity, a gas sensor in flow communication with the oven cavity and a controller configured to select one of a plurality of self-clean cycle times based upon a peak value of an output signal from said gas sensor in a self-clean cycle.

In another aspect, a self-cleaning oven is provided. The oven comprises an oven cavity, an exhaust vent in flow communication with said cavity, a gas sensor in flow communication with said exhaust vent, and a controller configured to select one of a plurality of predetermined self-clean cycle times based upon a peak value of an output signal of said gas sensor.

In another aspect of the invention, a self-cleaning oven is provided. The oven comprises an oven cavity, an exhaust vent in flow communication with said cavity, a gas sensor in flow communication with said exhaust vent, a cooling fan, and a controller. The controller is configured to cycle said fan on and off for a predetermined number of times in a self-clean cycle, and, when said fan is off, to read a sensor output from said gas sensor. Once a predetermined number of sensor readings have been obtained, the controller is configured to identify a peak value of said readings, and, based upon said identified peak value of said readings, to select one of a plurality of predetermined self-clean cycle times based upon said identified peak value.

In another aspect, a method of controlling an oven in a self-clean cycle is provided. The oven includes an oven cavity and a gas sensor in flow communication with the oven cavity, and a controller receiving an output signal from said gas sensor and operatively coupled to an oven heating element to raise a temperature of the oven cavity. The method comprises initiating a self-clean cycle when activated by a user, operating the oven heating element to heat the oven cavity, sensing a level of gas in said oven cavity at predetermined intervals over a predetermined time period, and, based on said sensed gas levels, identifying one of a plurality of soil levels in the oven cavity and selecting a self-clean time value in response to the sensed gas levels.

In still another aspect, a method of controlling an oven in a self-clean cycle is provided. The oven includes an oven cavity and a gas sensor in flow communication with the oven cavity in an exhaust vent, a controller receiving an output signal from the gas sensor and operatively coupled to an oven heating element to raise a temperature of the oven cavity, and a cooling fan in flow communication with the controller. The method comprises initiating a self-clean cycle when activated by a user, operating the oven heating element to heat the oven cavity, establishing a reference signal from the gas sensor in a first stage of the self-clean cycle, cycling the fan on and off in a second stage of the self-clean cycle, sensing a level of gas in said exhaust vent in an off portion of each cycling of the fan to obtain a predetermined number of sensor readings, identifying a peak value of the sensor readings in the second cycle, subtracting the reference signal from the peak value to determine an absolute sensor reading, and based upon the absolute value of the sensor reading, selecting one a plurality of predetermined self-clean times.

DETAILED DESCRIPTION

Figure 1:
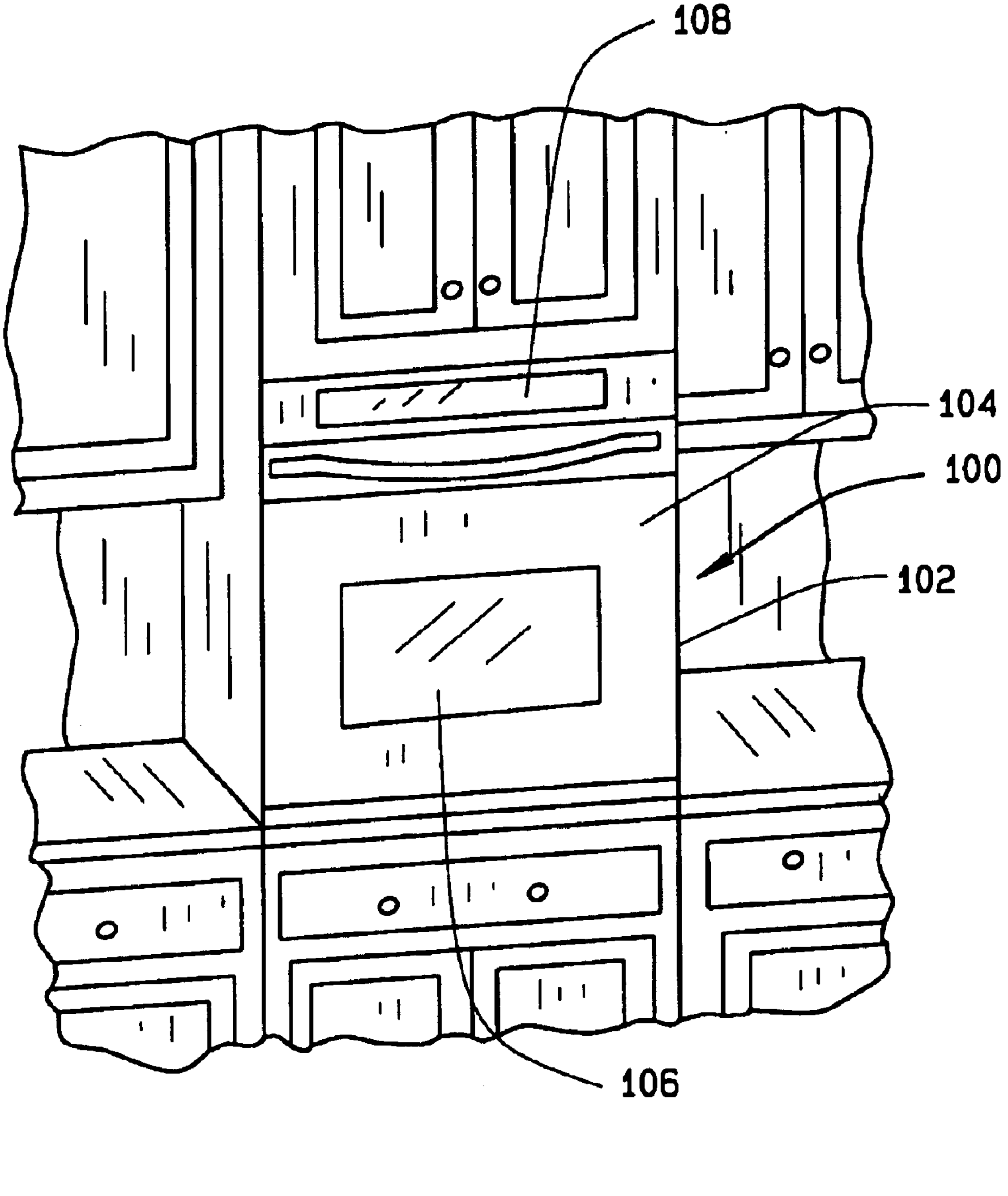
FIG. 1 is a front perspective view of an exemplary oven

FIG. 1 is front perspective view of an exemplary self-cleaning oven 100 including a cabinet 102 defining a cooking cavity accessible with a hinged door 104. Oven 100 is sometimes referred to as a single wall oven, and the cooking cavity contains a number of electrical heating elements, such as a broil heating element (not shown in FIG. 1) mounted to a ceiling of the cooking cavity, a bake element (not shown in FIG. 1) mounted to a floor of the oven cooking cavity, and a convection bake system including a heating element and a fan element fan (not shown in FIG. 1) mounted to a rear wall of the oven cooking cavity. Food is placed on removable oven racks (not shown) within the cooking cavity for heating by the broil element, the baking element or the convection bake system, and the cooking cavity is visible through a window 106 in access door 104.

The oven heating elements are selectively operable by manipulation of an electronic input interface panel 108 and controlled according to methods described below. In an exemplary embodiment, oven 100 is operable in a plurality of modes and includes a number of advanced features, including but not limited to timed bake and delayed bake functions for each of the oven heating elements and multi-stage cooking recipes and functions. In an alternative embodiment, a mechanical control interface may be employed having a number of input selectors, knobs, dials, etc. as those in the art will appreciate.

While the particular embodiment of oven 100 described herein is in the context of a single wall oven, such as oven 100, it is contemplated that the benefits of the invention accrue to other types of self-cleaning ovens, including but not limited to double wall ovens having first and second oven cavities, freestanding ovens and ovens including a variety of cooking elements, such as radiant cooking elements, microwave cooking elements, RF cooking elements, gas cooking elements, induction cooking elements, and light cooking elements. In addition, known reflecting elements and the like to focus heat energy in particular portions of the oven cooking cavity may be employed in various embodiments of the invention. Oven 100 is therefore described for illustrative purposes only and not by way of limitation.

As will be described in detail below, oven 100 executes an adaptive self-clean cycle that is responsive to actual soil conditions in the oven. When oven temperatures are raised to burn soil off of the oven interior surfaces, combustion by-products of the self-clean cycle are sensed and control decisions are made in response thereto to execute an energy efficient self-clean cycle while ensuring that the oven is adequately cleaned. Thus, when executed under varying oven soil conditions, the self-clean cycle executes for different time durations. Implemented in electronic controls, an oven self-clean algorithm adjusts oven clean time to optimize the self-clean cycle to ensure an adequate level of oven cleanliness without unnecessary energy consumption.

Figure 2:
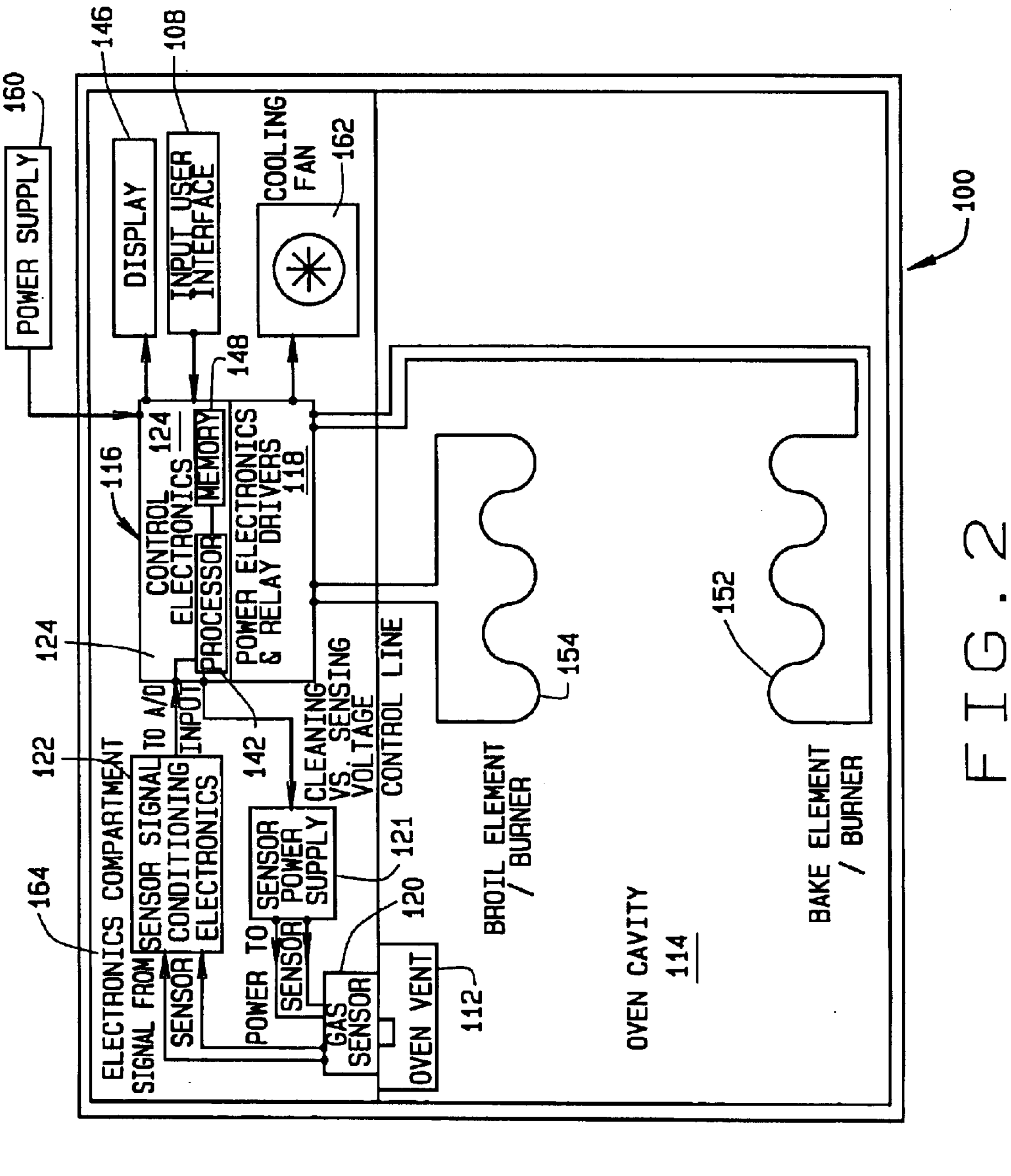
FIG. 2 is a block diagram of the oven shown in FIG. 1.

FIG. 2 is a block diagram of oven 100 (shown in FIG. 1) illustrating an exhaust vent 112 in flow communication with an oven cavity 114. A controller 116 operates one or more oven heating elements 152, 154 to heat oven cavity 114 for cooking operation. When a self-cleaning function is selected, such as by manipulating control interface 108, controller 116 operates oven heating elements 152, 154 to raise the temperature of oven cavity 114 to about 900° F. to burn cooking residue off of the interior surfaces of oven cavity 114.

The burning process emits products of combustion, and a constituent of the combustion by-products may be sensed with a gas sensor 120 to provide feedback control of a self-clean cycle. One such constituent by-product of the combustion process, for example, is carbon monoxide. Testing has shown that the level of carbon monoxide decreases after a period of time during self-cleaning, thereby indicating a decrease in combustion of soil and residue on the oven cavity surfaces. Thus, in an exemplary embodiment oven 100 includes a carbon monoxide sensor 120 in communication with exhaust vent 112 and powered by a sensor power supply 200 to output a voltage signal proportional to the carbon monoxide concentration in exhaust vent 112. In an illustrative embodiment, the signal from carbon monoxide sensor 120 is conditioned by electronic circuitry 122 to provide an appropriate range and scale of sensor readings. The output of carbon monoxide sensor 120 is read by electronic controls 124 to decide when to terminate the self-clean cycle depending on the sensed level of carbon monoxide.

While in an illustrative embodiment sensor 120 is used to monitor carbon monoxide levels, it is appreciated that in alternative embodiments other combustion gas constituents may be sensed and the self-clean cycle controlled according to the methods described below without departing from the scope of the present invention.

As explained in some detail below, the carbon monoxide sensor powering and processing electronics 121, 122, in conjunction with associated hardware and software, can be used to sense the level of oven cleanliness and define an optimum oven self-clean time through feedback from gas sensor 120.

In an exemplary embodiment, carbon monoxide sensor 120 is mounted in an exhaust portion of vent 112 rearward and away from oven cavity 114. As such, carbon monoxide sensor 120 is subjected to reduced temperatures relative to other potential locations, although it is appreciated that in alternative embodiments carbon monoxide sensor 120 may be positioned elsewhere relative to vent 112 or oven cavity 114 to sense a level of carbon monoxide during the oven cleaning process.

Controller 116 includes a microprocessor 142 coupled to an input interface 108 (shown in FIG. 1) and a memory 148. Memory 148 includes known RAM modules for storing user inputs, EEPROM elements, FLASH memory elements and/or or ROM memory known in the art for permanent storage of control system data. More specifically, memory 148 is loaded with cooking recipes, cooking algorithms, cooking parameters and data for operating oven heating elements, and self-clean cycle parameters, discussed below, for executing an optimal self-clean algorithm. For a given cooking session, microprocessor 142 receives input commands from input interface 108 or memory 148 and stores the commands in memory 148 or recalls commands from memory 148 for execution of a cooking routine by microprocessor 142.

Microprocessor 142 is operatively coupled to known oven heating elements, such as convection elements (not shown), thermal bake elements 152, and broil elements 154, through power controls 118 for respective modes of cooking. Heating elements, 152, 154 are operationally responsive to microprocessor 142 for energization thereof through relays, triacs, or other known mechanisms (not shown) of power controls 118 for cycling power to the oven heating elements. One or more temperature sensors or transducers sense operating conditions of oven heating elements 152, 154 and the sensors are coupled to an analog to digital converters (A/D converters) 158 to provide a feedback control signal to microprocessor 142. Power is supplied to processor 142 from a power supply 160, and microprocessor 142 cycles power from power supply 160 to the oven heating elements, including but not limited to heating elements 152 and 154, to execute cooking algorithms.

It is contemplated that controller 116 may be adapted for controlling additional oven heating elements beyond those depicted in FIG. 2 without departing from the scope and spirit of the present invention. For example, cooktop surface heating units in a freestanding oven, radiant cooking elements, microwave cooking elements, RF cooking elements, gas cooking elements, induction cooking elements, and light cooking elements may be controlled by control system 140.

Carbon monoxide sensor 120 is coupled to microprocessor 142 so that microprocessor 142 may communicate with sensor 120 and sample a signal output from sensor 120 as described below. In addition, an ambient cooling fan 162 is coupled to microprocessor 142 and is responsive thereto. When energized by microprocessor 142, fan 162 draws ambient air into a compartment 164 housing electronic components of oven 100. Oven electronic components are therefore cooled by fan 162 as oven 100 is used.

Figure 3:
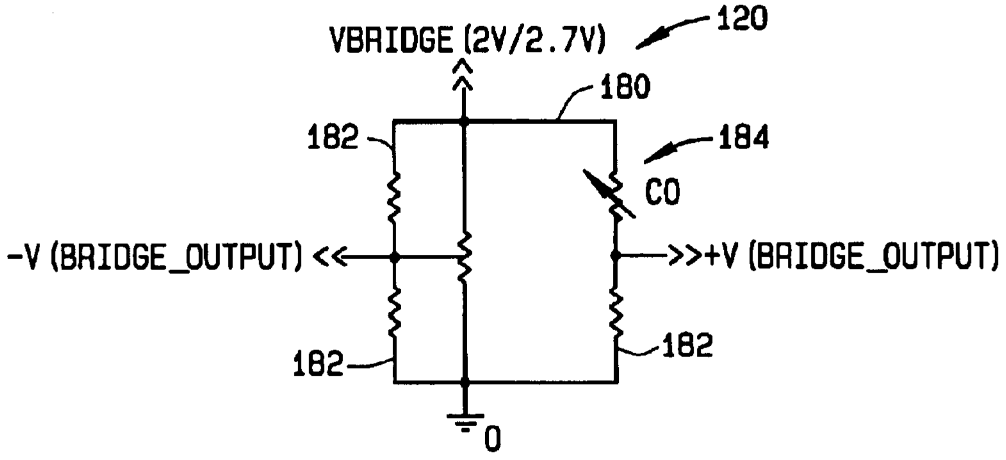
FIG. 3 is a schematic diagram of a sensor employed in the oven (shown in FIGS. 1 and 2).

FIG. 3 is a schematic diagram of an exemplary carbon monoxide sensor 120. In an illustrative embodiment, carbon monoxide sensor 120 is a platinum-based sensor, and as illustrated in FIG. 3, is essentially an unbalanced resistive bridge 180 where one leg 182 of the bridge is replaced by a Platinum coated filament 184. In further embodiments, sensor 120 is also equipped with a thermal compensation element, as well as an offset adjusting potentiometer. While one exemplary carbon monoxide sensor 120 is set forth above, it is appreciated that other carbon monoxide sensors may be employed in the present invention in lieu of sensor 120.

As those in the art may appreciate, the Platinum coated filament 184 of sensor 120 creates a signal at an output of the sensor by creating a bridge unbalance depending upon the level of carbon monoxide being sensed. As the carbon monoxide concentration sensed by the Platinum coated filament 184 increases, the bridge unbalance increases. As the bridge unbalance increases, the signal output generated by sensor 120 likewise increases. In contradistinction, as a carbon monoxide concentration sensed by the Platinum coated filament decreases, the bridge unbalance decreases, and a smaller signal is generated by sensor 120.

When the Platinum coated filament 184 is placed in flow communication with the exhaust stream of oven cavity 114 (shown in FIG. 2), carbon monoxide sensor 120 generates a signal representative of a carbon monoxide concentration in oven cavity 114. As the carbon monoxide concentration is indicative of a level of combustion in oven cavity 114, an amount of combustion in oven cavity 114 may be monitored to optimize an oven self-clean cycle.

Figure 4:
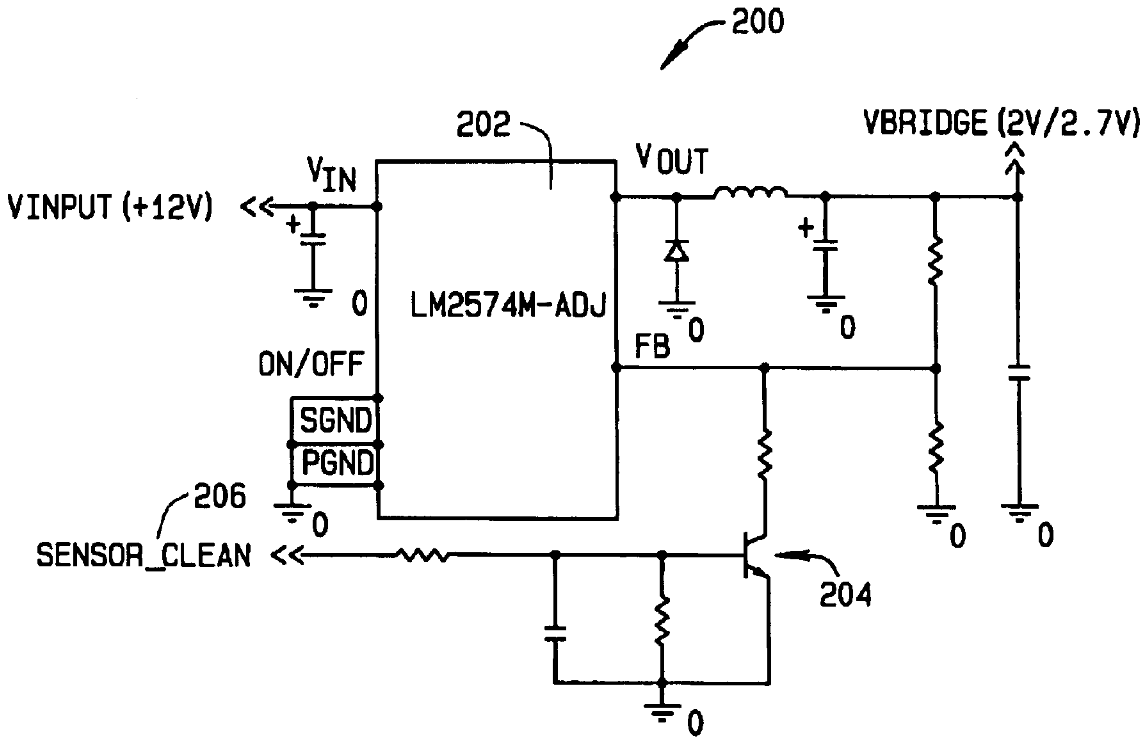
FIG. 4 is a schematic diagram of a power supply for the sensor shown in FIG. 3.

FIG. 4 is a schematic diagram of an exemplary power supply 200 for sensor 120 (shown in FIG. 3). In an illustrative embodiment, the carbon monoxide sensor power supply is implemented using a switching buck regulator 202. In an exemplary embodiment, regulator 202 is a commercially available LM2574 series regulator (and in a particular embodiment an LM2574-ADJ model regulator), and is a monolithic integrated circuit. Such regulators are available from a variety of manufacturers familiar to those in the art, including but not limited to On Semiconductor and National Semiconductor.

While switching power supplies are preferred over linear power supplies, it is appreciated that linear power supplies may likewise be employed within the scope of the present invention. Switching power supplies, however, are advantageous in that they can be programmed to generate a variety of desired output voltages, and they also provide a greater voltage stability and smaller voltage ripple than other power supplies.

During normal sensor operation, NPN transistor 204 is OFF, and the supply 200 generates nominal voltage for powering CO Sensor Bridge 180 (shown in FIG. 3). At the beginning of every self-clean cycle, NPN transistor 204 is turned on via a microprocessor output port 206 (Sensor_ clean node in FIG. 4) to clean the platinum coated filament 184 of sensor 120 (shown in FIG. 3). This action changes a negative feedback circuit for the switching power supply 200, consequently changing the generated supply voltage for CO Sensor Bridge 180. Usually CO sensor cleaning voltage is higher as compared to CO sensor nominal voltage. This elevated voltage is needed to increase platinum filament temperature to the point where a majority of deposited contaminants will be burned off the filament. Cleaning of the filament 184 at the beginning of each self-clean cycle facilitates optimal carbon monoxide sensing by sensor 120.

Figure 5:
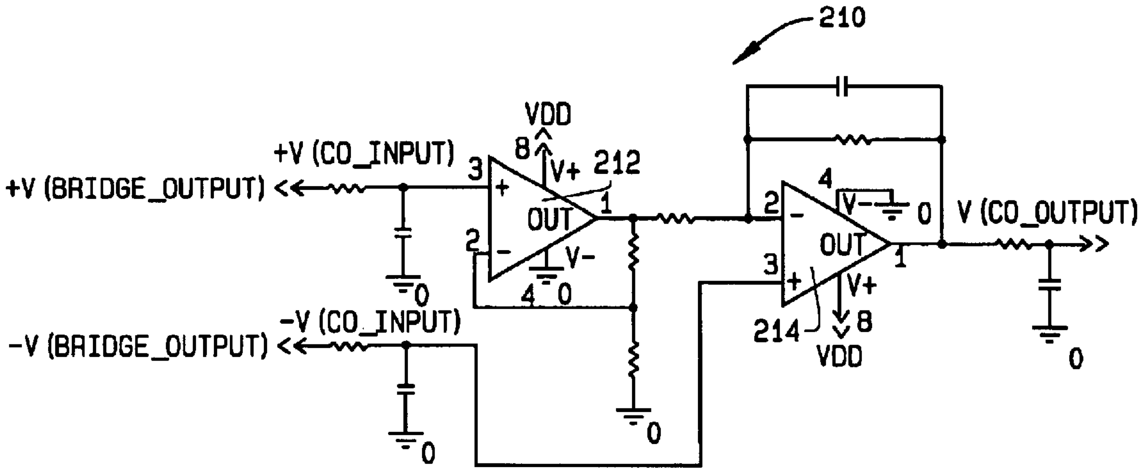
FIG. 5 is a schematic diagram of a sensor signal conditioner for the sensor shown in FIG. 3.

FIG. 5 is a schematic diagram of a sensor signal conditioner 210 for sensor 120 (shown in FIG. 3). In an exemplary embodiment, signal conditioning is provided in the form of a sensor amplifier. As illustrated in FIG. 5, the amplifier is implemented using operational amplifiers 212, 214, and is capable of differential mode input and a single ended output. In one embodiment, since the amplified signal is rather small (e.g., several tenths of mV range), the amplifier has low offset voltages and a large gain. To prevent signal loading, both amplifier inputs are high impedance. To perform in a wide range of operating temperatures, the amplifier exhibits low thermal drift.

As is evident from FIG. 5, the amplifier is a differential amplifier constructed from two operational amplifiers 212, 214. As such, the amplifier is capable of sensing differential input voltage, and has a single ended output. By applying 0.1% tolerance resistors and low offset drift operational amplifiers 212, 214 (such as chopper-stabilized operational amplifiers) acceptable signal conditioning is achieved.

Figure 6:
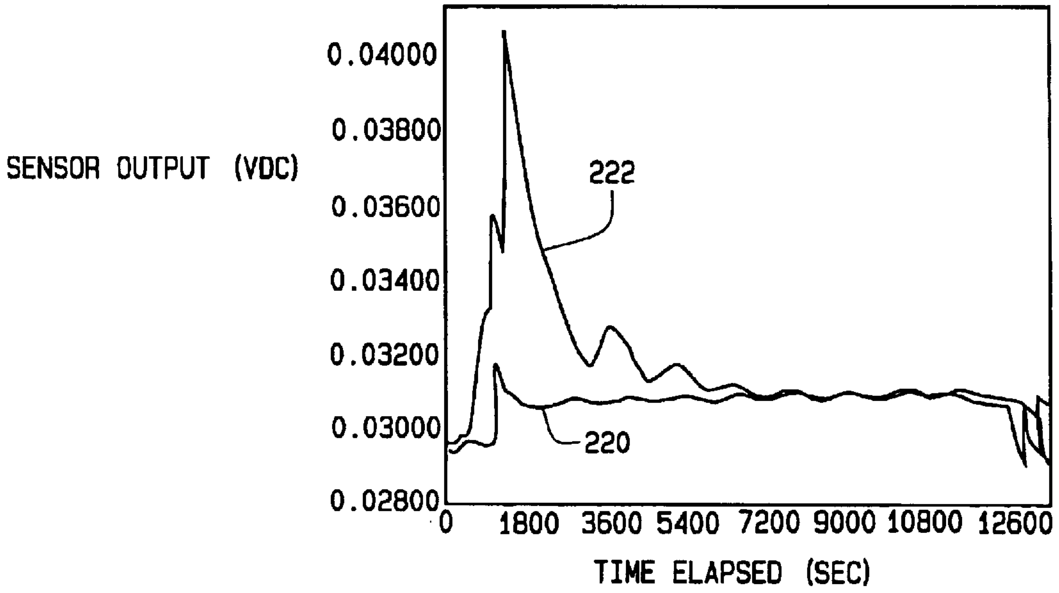
FIG. 6 is an exemplary sensor signal output plotted over time.

FIG. 6 is an exemplary sensor signal output plotted over time under different soil conditions of at least one oven. The lower plot 220 is generated by an oven in a generally soil-free condition, and as explained further below, such a plot can be used as a baseline for making self-clean decisions. The upper plot 222 is for the oven in a heavily soiled condition wherein a mixture of food such as beef, egg, tomato sauce, and cheese is spread on the interior surfaces of the oven. As indicated in FIG. 6, the output of the carbon monoxide sensor quickly rises at the beginning of the self-clean cycle when oven temperatures cause combustion of the soil on the interior of the oven cavity. After reaching a peak, the signal from the carbon monoxide sensor rather rapidly falls until it reaches a substantially constant level wherein no additional combustion takes place.

As may be seen in FIG. 6, sensor output 222 peaks at a time over two hours prior to the completion of a conventional self-clean cycle which includes a time duration of four hours (14,400 seconds). Thus, control decisions may be made, based upon the output from carbon monoxide sensor, to terminate a self-clean cycle in an energy efficient manner commensurate with soil conditions in the oven.

One way the self-clean cycle may be optimized, and as illustrated in FIG. 6, the peak magnitude of the carbon monoxide output signal 222 may be divided into a plurality of levels, each corresponding to a different self-clean cycle time duration. In other words, based upon the signal output from carbon monoxide sensor 120 (shown in FIG. 3) over time, and more specifically by identifying a peak output value of the carbon monoxide sensor 120 over the course of a self-clean cycle, the soil level of the oven may be deemed to be one of a plurality of pre-designated levels and a self-clean cycle appropriate for that soil level may be accordingly executed. As illustrated in FIG. 6, the carbon monoxide sensor peak output is divided into five levels (i.e., level 1 corresponding to sensor peak outputs of 0.030–0.032, level 2 corresponding to sensor peak outputs of 0.032–0.034, etc.) although it is appreciated that in alternative embodiments greater or fewer levels may be utilized corresponding to different threshold values.

Figure 7:
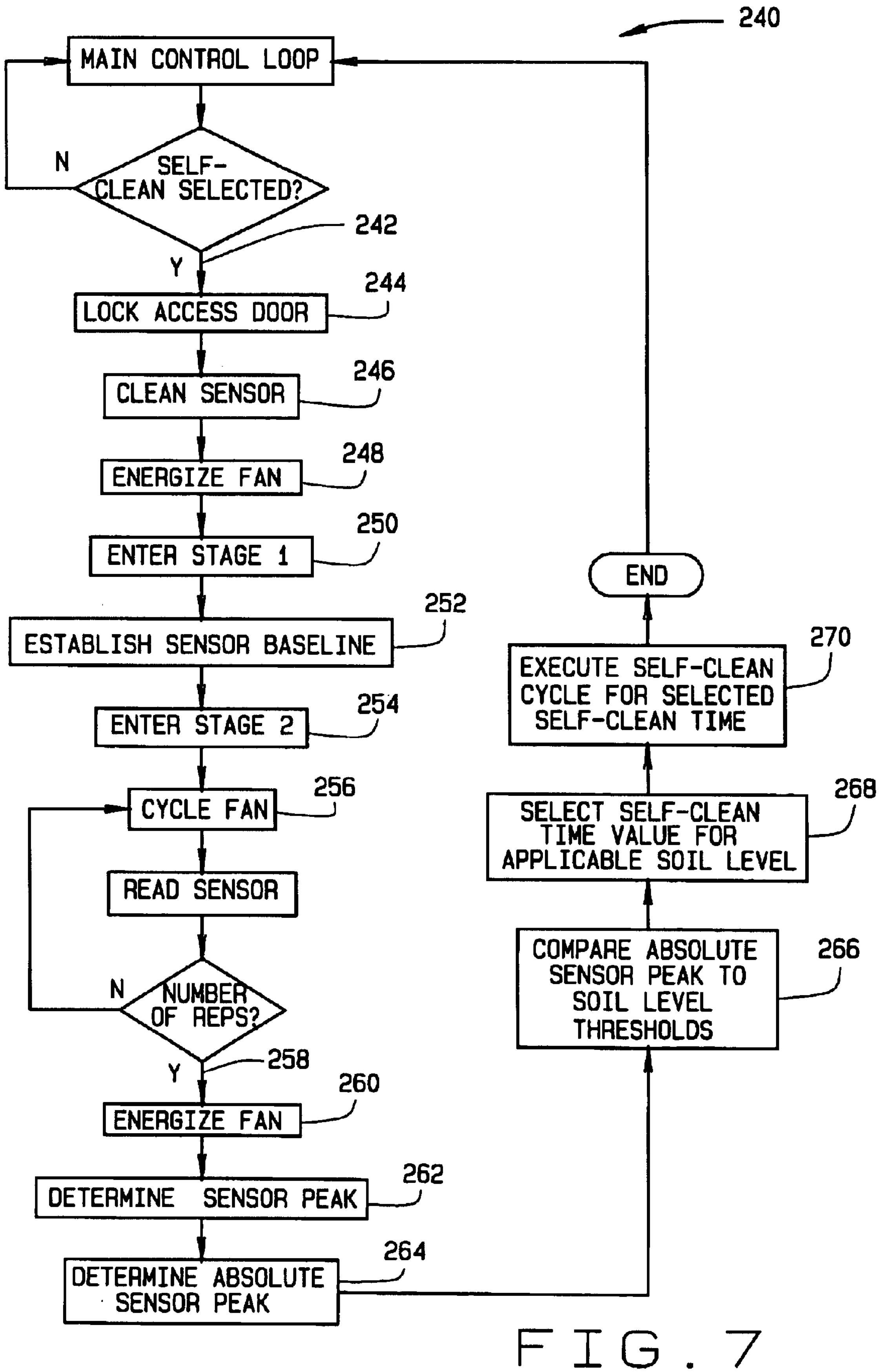
FIG. 7 is an oven self-clean control algorithm executable by the oven shown in FIG. 1.

FIG. 7 is an oven self-clean control algorithm 240 executable by controller 116 (shown in FIG. 2), and more specifically by microprocessor 142 (shown in FIG. 2) for producing an energy efficient self-clean cycle appropriate for sensed soil conditions of the oven.

Execution of algorithm 240 utilizes the following parameters stored in controller memory 148 (shown in FIG. 2): a Level 1 to Level 2 threshold, a Level 2 to Level 3 threshold, a Level 3 to Level 4 threshold, a Level 4 to Level 5 threshold, a Sensor Clean Time (Level 1), a Sensor Clean Time (Level2), a Sensor Clean Time (Level3), a Sensor Clean Time (Level4), a Sensor Clean Time (Level5), an Ambient Cooling Fan ON Time (CO gas sensor), an Ambient Fan OFF Time (CO gas sensor), and a Number of repetitions (CO gas sensor) parameter.

The Level x to Level y thresholds correspond to the sensor peak signal output level dividing points illustrated In FIG. 6 and are used to distinguish oven soil levels from one another. The Sensor Clean Time (Level x) values refer to self-clean time duration values corresponding to each of the soil level values, and as the soil level increases (i.e., as the peak values of the carbon monoxide sensor increases) the self-clean time value increases. Cooling fan on and off times refer to time duration values that the fan 162 is energized or de-energized, as the algorithm executes.

In an exemplary embodiment, execution of algorithm 240 is as follows. The algorithm begins when a user initiates 242 a self-clean mode of the oven by manipulating control interface 108 (shown in FIG. 1) of oven 100 (shown in FIG. 1). Once the self-clean mode is activated, controller 116 automatically locks 244 oven cavity access door 104 (shown in FIG. 1) in a closed position. In an illustrative embodiment, the oven door is locked 244 by controller 116 until the oven temperature reaches 180° F. When the oven door is locked 244, sensor is cleaned 246 as described above in relation to FIG. 3.

Once the oven door is locked 144 and sensor 120 is cleaned 246, ambient cooling fan 162 (shown in FIG. 2) is turned on 248, and controller 116 begins to execute 250 a first stage of the Self-Clean cycle by energizing an oven broiler element 154 (shown in FIG. 2) applying primarily top heat to oven cavity 114 to raise a temperature thereof. While the first stage of the self-clean cycle is executed 250, and while the ambient cooling fan 162 is fully turned on, an output of the carbon monoxide sensor 120 is monitored to establish 252 a baseline level of carbon monoxide in the oven before the majority of combustion of soil and residue commences. Ambient cooling fan 162 draws air from an electronics compartment area and mixes it with gases being generated by burning and incinerating food contaminants due to extremely high cavity temperatures. This mixing of compartment air and cavity gas flowing through vent 112 dilutes carbon monoxide gas concentration to practically negligible levels.

Since carbon monoxide sensor 120 protrudes into oven vent 112 downstream from an air/gas mixing point when the cooling fan 162 is on, the carbon monoxide sensor 120 senses negligible amounts of carbon monoxide gas. Signals generated by carbon monoxide sensor 120 during first stage of the self-clean algorithm is considered an ambient air/reference signal, similar to the lower sensor output plot shown in FIG. 6.

As the self-clean cycle first stage is completed, a second stage commences 254. In the second stage controller 116 applies a combination of top and bottom heat (i.e., controller 116 energizes oven broil and bake elements 154, 152, respectively). In an alternative embodiment, the second stage employs bottom heat only (e.g., only the oven bake element 152 is energized).

At the beginning of the second stage, controller 116 begins to cycle 256 ambient cooling fan 162 for the predetermined on and off times stored in controller memory 148. While the ambient cooling fan 162 is ON, controller compartment air and cavity gas dilution takes place as note above, and carbon monoxide sensor senses negligible amounts of carbon monoxide gas. While the ambient cooling fan 162 is OFF, air is not drawn from the electronics compartment into the oven vent 112. Consequently, gas mixing and carbon monoxide dilution does not occur and carbon monoxide sensor 120 senses a carbon monoxide gas concentration in the exhaust vent 112 that is generated by burning and incinerating food contaminants due to high oven cavity temperatures. Ambient cooling fan 162 is cycled 156 ON and OFF for a predetermined number of times corresponding to a Number of Repetitions parameter stored in controller memory 148.

Ambient Fan OFF time and Ambient Fan ON time parameters may be empirically determined for a given oven platform, but as a practical matter Ambient Fan OFF time is selected to avoid overheating of the electronics control area compartment, and also to prevent thermal runaway switch tripping. Likewise, the Number of repetitions parameter may be empirically determined for a specified oven platform, but should be large enough to allow the fan to cycle for a sufficient time so that the largest concentration of carbon monoxide gas may be properly sensed and identified, as explained below.

After the Number of Repetitions cycles have been executed 258, ambient cooling fan 162 is again turned ON. At this point, controller 116 has captured a Number of Repetitions readings for CO gas concentration. Controller 116 then searches the sensor readings and determines 162 the highest captured signal value (i.e., the peak value) of the sampled sensor readings.

In an exemplary embodiment, the highest captured signal value of the sampled sensor output values is subtracted 262 from the ambient air reference value obtained when the self-clean cycle first stage is executed 252. An absolute value signal for the sensed carbon monoxide concentration (CO Absolute Value) is therefore established. This CO Absolute Value is compared to the predetermined Level x to y thresholds stored in controller memory 148. A soil level is then selected 268 that contains the CO Absolute Value determined from step 264. Once the appropriate soil level is identified, controller 116 selects 268 the corresponding Sensor Clean Time (Level x) parameter stored in controller memory.

After the Sensor Clean Level parameter is selected 268, controller 116 executes the self-clean cycle for the duration of the time value specified by the appropriate Sensor Clean Level parameter.

Having now described the methodology, it is believed that those skilled in the art of electronic controllers could program algorithm to execute the above-described adaptive oven self-cleaning cycle. The above-described apparatus and methodology achieves a desired level of cleanliness in an optimum amount of time, regardless of soil level present in oven cavity. Time and energy consumed in the self-clean cycle of the oven is therefore optimized, and user expectations and customer satisfaction are maintained.

While the invention has been described in terms of various specific embodiments, those skilled in the art will recognize that the invention can be practiced with modification within the spirit and scope of the claims.

What is claimed is:

1. A self-cleaning oven comprising:

an oven cavity;

a gas sensor in flow communication with the oven cavity;

a controller configured to select one of a plurality of self-clean cycle times based upon a peak value of an output signal from said gas sensor in a self-clean cycle; and a cooling fan, said controller configured to cycle said fan on and off, and, when said fan is off, to read a sensor output from said gas sensor.

2. An oven in accordance with claim 1 wherein said gas sensor is a carbon monoxide sensor.

3. An oven in accordance with claim 2 wherein said gas sensor comprises a Platinum coated filament.

4. An oven in accordance with claim 1 further comprising an exhaust vent in flow communication with the oven cavity, said gas sensor in flow communication with said exhaust vent.

5. An oven in accordance with claim 1 wherein said controller is configured to:

determine a reference value of an output signal of said gas sensor in a first stage of a self-clean cycle;

determine a peak value of the output signal of said gas sensor in a second stage of the self-clean cycle; and subtract said reference value from said peak value to select said one of a plurality of self-clean cycle times.

6. A self-cleaning oven comprising:

an oven cavity;

an exhaust vent in flow communication with said cavity;

a gas sensor in flow communication with said exhaust vent;

a controller configured to select one of a plurality of predetermined self-clean cycle times based upon a peak value of an output signal of said gas sensor; and a cooling fan, said controller configured to cycle said fan on and off according to predetermined on and off time parameters, said controller further configured to sample a gas sensor output when said fan is off.

7. An oven in accordance with claim 6 wherein said gas sensor comprises a carbon monoxide sensor.

8. An oven in accordance with claim 7 wherein said carbon monoxide sensor comprises an unbalanced resistive bridge comprising a Platinum coated filament.

9. An oven in accordance with claim 6, said controller configured to sample a signal from said gas sensor to obtain a predetermined number of samples, and once said predetermined number of samples is obtained, to identify said peak value of said samples.

10. An oven in accordance with claim 9 wherein said controller comprises a memory comprising a plurality of soil level threshold parameters, said soil level threshold parameters defining a plurality of soil levels, each of said soil levels corresponding to one of said plurality of predetermined self-clean cycle times, said controller configured to select one of said plurality of predetermined self-clean cycle times based upon said peak value.

11. A self-cleaning oven comprising:

an oven cavity;

an exhaust vent in flow communication with said cavity;

a gas sensor in flow communication with said exhaust vent;

a cooling fan; and a controller configured to:

cycle said fan on and off for a predetermined number of times in a self-clean cycle, and, when said fan is off, to read a sensor output from said gas sensor;

once a predetermined number of sensor readings have been obtained, identifying a peak value of said readings; and based upon said identified peak value of said readings, selecting one of a plurality of predetermined self-clean cycle times based upon said identified peak value.

12. An oven in accordance with claim 11 wherein said gas sensor comprises a carbon monoxide sensor.

13. An oven controller in accordance with claim 11, said controller further configured to:

determine a reference value of an output signal of said gas sensor in a first stage of the self-clean cycle;

sample an output signal of said gas sensor in a second stage of the self-clean cycle, said peak value determined from samples obtained in said second stage; and subtract said reference value from said peak value to select said one of a plurality of predetermined self-clean cycle times.

14. An oven controller in accordance with claim 11 wherein there are five predetermined self-clean cycles corresponding to different soil levels in the oven.

15. A method of controlling an oven in a self-clean cycle, the oven including an oven cavity and a gas sensor in flow communication with the oven cavity, the oven further including a controller receiving an output signal from said gas sensor and operatively coupled to an oven heating element to raise a temperature of the oven cavity, said method comprising:

initiating a self-clean cycle when activated by a user;

operating the oven heating element to heat the oven cavity;

sensing a level of gas in said oven cavity at predetermined intervals over a predetermined time period;

based on said sensed gas levels, identifying one of a plurality of soil levels in the oven cavity and selecting a self-clean time value in response to the sensed gas levels;

subtracting a reference value from a peak value to generate an absolute value; and comparing the absolute value with at least one predetermined soil level to determine the self-clean time value.

16. A method in accordance with claim 15 wherein said sensing a level of gas comprises sensing a level of carbon monoxide.

17. A method in accordance with claim 15 wherein said identifying one of a plurality of soil levels in the oven cavity and selecting a self-clean time value comprises identifying a peak sensor output value, and based upon the peak sensor output value, to select one of a plurality of predetermined self-clean times.

18. A method in accordance with claim 15 further comprising:

establishing the reference value of an output signal of said gas sensor in a first stage of the self-clean cycle;

determining the peak value to be a peak value of the output signal of said gas sensor in a second stage of the self-clean cycle.

19. A method of controlling an oven in a self-clean cycle, the oven including an oven cavity and a gas sensor in flow communication with the oven cavity in an exhaust vent, the oven further including a controller receiving an output signal from said gas sensor and operatively coupled to an oven heating element to raise a temperature of the oven cavity, the oven including a cooling fan in flow communication with said controller, said method comprising:

initiating a self-clean cycle when activated by a user;

operating the oven heating element to heat the oven cavity;

establishing a reference signal from the gas sensor in a first stage of the self-clean cycle;

cycling the fan on and off in a second stage of the self-clean cycle;

sensing a level of gas in said exhaust vent in an off portion of each cycling of the fan to obtain a predetermined number of sensor readings;

identifying a peak value of the sensor readings in the second stage;

subtracting the reference signal from the peak value to determine an absolute value of the sensor readings; and based upon the absolute value of the sensor readings, selecting one a plurality of predetermined self-clean times.

20. A method in accordance with claim 19 wherein sensing a level of gas comprises sensing a level of carbon monoxide gas.

21. A method in accordance with claim 19, the controller including a memory having a plurality of soil level threshold values corresponding to different soil levels in the oven, each of said soil level threshold values associated with a self-clean time value parameter, said selecting one a plurality of predetermined self-clean times comprising comparing the absolute value of the sensor readings to the soil level threshold values to determine an applicable soil level, and once the applicable soil level is determined, selecting a time value parameter associated with the applicable soil level.

* * * * *